(12) United States Patent
Schubert

(10) Patent No.: US 6,817,711 B2
(45) Date of Patent: Nov. 16, 2004

(54) APPARATUS FOR POSITIONING A LENS

(75) Inventor: John R. Schubert, Kerrville, TX (US)

(73) Assignee: Mageyes, Inc., Kerrville, TX (US)

( * ) Notice: Subject to any disclaimer, the term of this patent is extended or adjusted under 35 U.S.C. 154(b) by 0 days.

(21) Appl. No.: 10/441,570

(22) Filed: May 20, 2003

(65) Prior Publication Data
US 2003/0202153 A1 Oct. 30, 2003

Related U.S. Application Data

(62) Division of application No. 09/977,184, filed on Oct. 12, 2001, now Pat. No. 6,595,635.

(51) Int. Cl.$^7$ ................................................. G02C 3/00
(52) U.S. Cl. ...................................................... 351/155
(58) Field of Search ................................. 351/155, 140, 351/158, 41; 2/10; 24/3.12, 3.3

(56) References Cited

U.S. PATENT DOCUMENTS

| | | |
|---|---|---|
| 1,696,198 A | 2/1928 | Gross |
| 1,665,513 A | 4/1928 | Thomas |
| 1,768,597 A | 7/1930 | Gwathmey, Jr. |
| 1,833,741 A | 11/1931 | Diehl |
| 2,187,932 A | 1/1940 | Cornell |
| 2,280,354 A | 4/1942 | Rezos |
| 2,419,661 A | 4/1947 | Staaf |
| 2,433,164 A | 12/1947 | Shields |
| 2,459,021 A | 1/1949 | Frommer |
| 2,481,960 A | 9/1949 | Wall et al. |
| 2,500,280 A | 3/1950 | Feldman |
| 2,538,607 A | 1/1951 | Vaca |
| 2,538,608 A | 1/1951 | Vaca |
| 2,549,445 A | 4/1951 | Friess |
| 2,598,145 A | 5/1952 | Steadman, Jr. |
| 2,619,641 A | 12/1952 | Vaca |
| 2,648,091 A | 8/1953 | Jones |
| 2,654,089 A | 10/1953 | Tannenbaum |
| 2,725,560 A | 12/1955 | Feldman |
| D194,284 S | 12/1962 | Baratelli |
| 3,325,824 A | 6/1967 | Donegan |
| 3,572,931 A | 3/1971 | Adler |
| 4,541,125 A | 9/1985 | Phillips |
| 4,740,069 A | 4/1988 | Baum |
| D296,337 S | 6/1988 | Caplan |

(List continued on next page.)

FOREIGN PATENT DOCUMENTS

| | | |
|---|---|---|
| AU | 158859 | 6/1952 |
| GB | 1289321 | 9/1972 |
| WO | WO 93/22946 A1 | 11/1993 |

OTHER PUBLICATIONS

PCT International Search Report for PCT/FR93/00452, 6 pgs., (Aug. 27, 1993).

Harper Collins Roberts French College Dictionary, © 2000 Harper Collins Publishers, cover page, copyright page and p. 304 for translation of "lunettes" (3 pages total).

Brochure published by Herrco Enterprises, Inc., Specialty Product of Baltimore. Maryland, entitled: "Telescopic Magnifiers," front and back (2 pages total).

(List continued on next page.)

Primary Examiner—Hung Xuan Dang
(74) Attorney, Agent, or Firm—Akin Gump Strauss; Hauer & Feld LLP

(57) ABSTRACT

A clip having an upper positioning member and a lower positioning member is disclosed for removably attaching a magnifying lens to a visor or brim of a hat. A carriage having a sliding portion and a supporting portion is slidably positioned with the lower positioning member. One end of a link is pivotably positioned with the supporting portion of the carriage. A holding member is pivotably positioned with the other end of the link. The holding member is movable between a rest position, a gripping position to grip the lens and a flexed position to facilitate removal of the lens.

29 Claims, 4 Drawing Sheets

U.S. PATENT DOCUMENTS

| | | | |
|---|---|---|---|
| 4,795,235 | A | 1/1989 | Spitzberg |
| 4,815,838 | A | 3/1989 | Liautaud |
| 4,819,274 | A | 4/1989 | Day |
| 4,886,340 | A | 12/1989 | Kanda |
| 4,951,316 | A | 8/1990 | Moody |
| 5,056,164 | A | 10/1991 | Lisle |
| 5,129,102 | A | 7/1992 | Solo |
| 5,181,139 | A | 1/1993 | Benitez |
| D333,828 | S | 3/1993 | Baldassarre |
| 5,208,916 | A | 5/1993 | Kelman |
| 5,261,124 | A | 11/1993 | Day |
| 5,297,298 | A | 3/1994 | Salatka et al. |
| 5,412,812 | A | 5/1995 | Gatchalian |
| D359,060 | S | 6/1995 | Sherlock et al. |
| 5,533,207 | A | 7/1996 | Diaz |
| 5,548,841 | A | 8/1996 | Sherlock et al. |
| 5,689,827 | A | 11/1997 | Ryder |
| 5,715,030 | A | 2/1998 | Quaresima |
| 5,720,040 | A | 2/1998 | Simone |
| 5,727,251 | A | 3/1998 | Sherlock et al. |
| 5,880,805 | A | 3/1999 | Naessens et al. |
| 5,920,370 | A | 7/1999 | Glanzbergh |
| 5,987,640 | A | 11/1999 | Ryder |
| 5,996,127 | A | 12/1999 | Leslie |
| 6,247,205 | B1 | 6/2001 | Damadian et al. |
| 6,595,635 | B2 | 7/2003 | Schubert |
| 2003/0071961 | A1 | 4/2003 | Schubert |
| 2003/0202153 | A1 | 10/2003 | Schubert |

OTHER PUBLICATIONS

"The Catalog of Magnifiers", published by C and E Optical, Inc., of Chicago, IL, front, back and inside covers, pp. 7 and 16, and price list from C and E Optical, Inc. dated Apr. 1993 (8 pages total).

"1993 Annual Reference Catalog For Optics, Science and Education," published by ES Edmund Scientific of Barrington, New Jersey; © 1992 Edmund Scientific Co. vol. 13N1; front, back and inside covers and pp. 3, 101, 186 and 203 (5 pages total).

Photocopy of box entitled: OptiVISOR Optical Glass Binocular Magnifier® made by Donegan Optical Company, Inc. (2 pages total) (See above U.S. Patent No. 3,325,824).

6 photographs (No. 1–6) of black headband magnifier (no date but prior art) (2 pages total).

5 photographs (No. 1–5) of pink classic "Canyon Ranch®" visor by 3–D Activeware, Inc., U.S. patent pending (2 pages total) (no date by prior art).

Brochure entitled: How to Get the Most from Your OptiVISOR!, published by Donegan Optical Company, Rev. Jan. 1991; fron and back (2 pages total).

Instruction sheet on "Here is . . . 'The Best you'll ever see' your Slip–on New 3–D Binocular Magnifier" made by Magna Sales Company of Chicago, Illinois 60618 (1 sheet—front and back) and two sheets containing six photographs of same. © 1994 Magna Sales. (4 pages total).

Herrschner® Quality Needlecrafts Since 1899. ®Copyright., Herrschners 1994; cover page, inside cover page and p. 46 (3 pages total).

Clam shell pack insert label entitled: Spring Clip Opticaid made by Edroy Products of Nyack, NY 10960 (1 page total).

Photocopy of box entitled: Flip–Focal™ made by Flip–Focal, Inc., V.R.M. Co. (2 pages total).

"Sports and Leisure VisorBinocular," http://members.aol.com/ettored/binvisorw.htm, printed Dec. 19, 2001 (4 pages).

APPARATUS FOR POSITIONING A LENS

CROSS-REFERENCE TO RELATED APPLICATIONS

The present application is a divisional of U.S. patent application Ser. No. 09/977,184, filed Oct. 12, 2001 now U.S. Pat. No. 6,595,635.

BACKGROUND OF THE INVENTION

1. Field of the Invention

This invention relates generally to an apparatus for removably positioning a magnifying lens on a visor or brim of a hat or cap, and more particularly, the magnifying lens is removably positioned with a holding member that permits the interchangeability of lenses with different magnifications.

2. Description of the Related Art

There are headbands in common use that are used to position a magnifying lens. A headband magnifier comprising a one-piece headband where the back portion is disengageable so that the headband is movable between an at-rest position and a compression position is known. This headband magnifier, that provides a holding member that facilitates interchangeability of the lenses, is disclosed in U.S. Pat. No. Design 359,060, and U.S. Pat. Nos. 5,548,841 and 5,727,251. All of these patents are assigned to the assignee of the present invention, and are incorporated herein by reference for all purposes. These headband magnifiers have been used in activities such as reading classified ads, stock reports, newspapers, magazines, phone books, dictionaries and maps. Crafters can use headband magnifiers for quilting, sewing, hand beading, woodcarving, lace making, knitting, crocheting, embroidering, painting, stamp collecting, leatherworking or any other craft where magnification of an item is desired. Additionally, students can use the headband magnifiers for field work, fossils and lab research. Also, professionals can use headband magnifiers for close-up work, for example, circuit boards, rework, assembly, dental, manicures/pedicures, inspection, schematics, cosmetic, tattooing, hair transplants, parts inspection, watch repair, drafting and electrical work.

Flip-Focal, Inc. of Paramus, N.J., sells a device under the trademark "FLIP-FOCAL" in which a magnifying lens is pivotably attached to a clip. The clip includes a pin and pin backing, inserted both through the clip and a visor, to secure the clip to the visor. Also, Edroy Products of Nyack, N.Y. sells a device with a magnifying lens pivotably attached to a link, which is in turn pivotably attached to a spring clip for the illustrated purpose of clipping the magnifier to a pair of eyeglasses. The Edroy Products device is sold under the trademark "OPTICAID."

Also, it has been known in the past to provide a visor and eyeshield assembly having at least three adjustment, points, such as disclosed in U.S. Pat. No. 5,987,640 (hereinafter the "'640 patent"). The '640 patent emphasizes that this combination visor and eyeshield must be able to protect the eye from direct and indirect sunlight, accommodate eyeglass wearers, fit well for people having different facial contours, be able to accommodate those who wear different hat sizes, be able to accommodate those with different hat-wearing habits, and be fashion sensitive. '640 patent, col. 2, Ins. 30–35. The '640 patent also discloses a visor and eyeshield assembly consisting of a cap used to secure a visor to the wearer's head, an eyeshield used to protect the wearer's eyes from sunlight, and a mechanism for securing the eyeshield to the visor in the form of a base, sliding member, and pivot joints. '640 patent, FIG. 1 and col. 5, Ins. 42–48. Additionally, the '640 patent discloses visor and eyeshield combinations that include a sliding member and a pivot joint that can he moved up or down, and backwards and forwards. '640 patent, col. 1, Ins. 40–50.

U.S. Pat. No. 5,208,916 discloses a sunglass assembly for attachment to a visor or brim of a hat or cap. A pair of parallel rails attach the sunglass to the visor, and a pair of slides allow translating the sunglass forward and backwards along the parallel rails. Further, the sunglass is pivotably attached to the slides to flip from horizontal, out of the user's line of vision, to an essentially vertical position relative to the user's eyes. U.S. Pat. No. 5,261,124 discloses a sunglass/wind shield goggles eyeshield assembly for a cap visor, with a clip for detachably mounting the sunglass/wind shield goggles assembly onto the visor. A slide block slides forward and backward in the clip body to adjust the position of the sunglass/wind shield goggles eyeshield assembly. The eyeshield is pivotably attached into and suspended from the slide block, allowing the eyeshield to be rotated into and out of the field of view. U.S. Pat. No. 5,208,916 is incorporated herein for all purposes.

However, none of the above patents or products disclose a two adjustment point magnifier removably mounted on a visor where a magnifying lens can be slid forward and backward to adjust the position of the magnifying lens in combination with pivoting the selected lens into and out of a viewing position in front of the user's eye to magnify an object, much less a three adjustment point magnifier. A magnifier with at least these two adjustment points, i.e., slide/pivot, that is attached to a visor or brim with a spring clip allows the magnifier to be easily removed from the visor or brim of the hat or cap so that it can be used on other caps. Also, none of the above sunglass/eyeshield assembly patents allow for interchanging of lenses of different powers of magnification for magnification of an object.

BRIEF SUMMARY OF THE INVENTION

According to the invention, a clip or other device having an upper positioning member and a lower positioning member is provided for removably attaching a magnifying lens to a visor or brim of a hat or cap. A carriage having a sliding portion and a supporting portion is provided so that the sliding portion is positioned for sliding movement relative to the lower positioning member. The carriage supporting portion extends below the lower positioning member. Additionally, a link having a first end and a second end is pivotably positioned with the supporting portion of the carriage. Alternatively, the first end of the link could be fixed with the supporting portion of the carriage, or the supporting portion could be elongated and substituted for the link. A holding member comprising a horizontal member connected between opposed members is preferably pivotably positioned with the second end of the link. The holding member is designed so that spring forces grip the sides of the magnifying lens. The holding member is movable between a rest position, a gripping position to grip the magnifying lens and a flexed position to facilitate removal of the magnifying lens. The magnifying lens is removably positioned with the holding member to allow replacement of the magnifying lens with other lens having different powers of magnification.

BRIEF DESCRIPTION OF THE SEVERAL VIEWS OF THE DRAWINGS

The objects, advantages, and features of the invention will become more apparent by reference to the drawings which are appended hereto and where like numerals indicate like parts and wherein an illustrated embodiment of the invention is shown, of which.

DETAILED DESCRIPTION OF THE INVENTION

Figure 1:
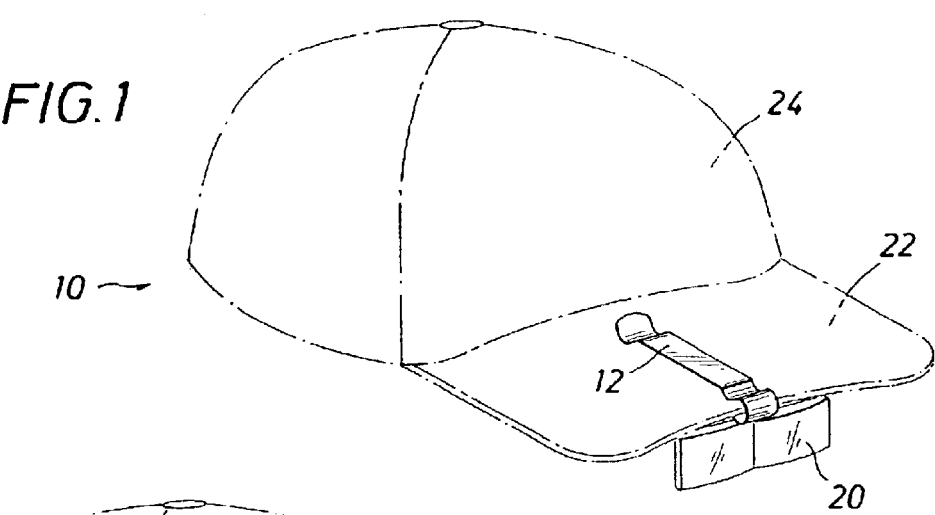
FIG. 1 is a perspective view of the visor magnifier or magnifying device of the present invention positioned from a visor or brim of a cap, where the cap is shown in phantom view and the magnifying lens is shown in the line-of-sight position.

The visor magnifier of the present invention is shown in the Figures. In particular, the preferred embodiment of the visor mounted magnifier, generally referred to as 10, is shown in FIGS. 1–6 and 11–12, and the alternative embodiment of the visor magnifier, generally referred to as 10', is shown in FIGS. 7–10 and 11–12. The preferred embodiment of the visor magnifier 10 comprises a clip 12, a carriage 14, link 16, a spring force holding member 18, and a magnifying lens 20, as best shown in FIGS. 3, 5, 6, 11 and 12.

While not a limitation of the invention, one intended use of the present invention is with a visor 22 extending from the front of a cap 24. While the present invention is shown attached to a cap 24, as shown in FIGS. 1–4, other type of visors are contemplated for use with the present invention, such as a hat with a fully encircling rim; a headband having a visor extending from the front of the headband, for example, a visor sold by 3-D Activewear, Inc. made from plastic; or a soft headband visor combination made from soft materials. Some of these visors generally extend three to five inches outwardly from the rim. Therefore, a visor could be a projecting front portion on a hat, cap or headband. Another example of a visor could be on a construction hardhat or any other types of visors.

Figure 2:
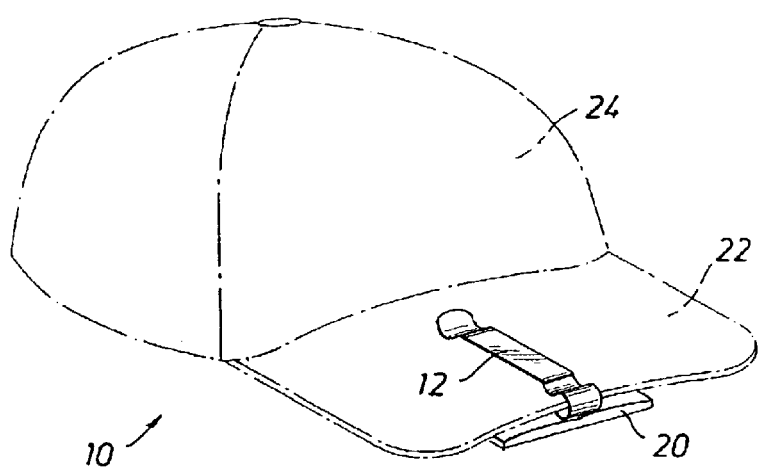
FIG. 2 is a view similar to FIG. 1 with the magnifying lens shown in the non-use position.
Figure 3:
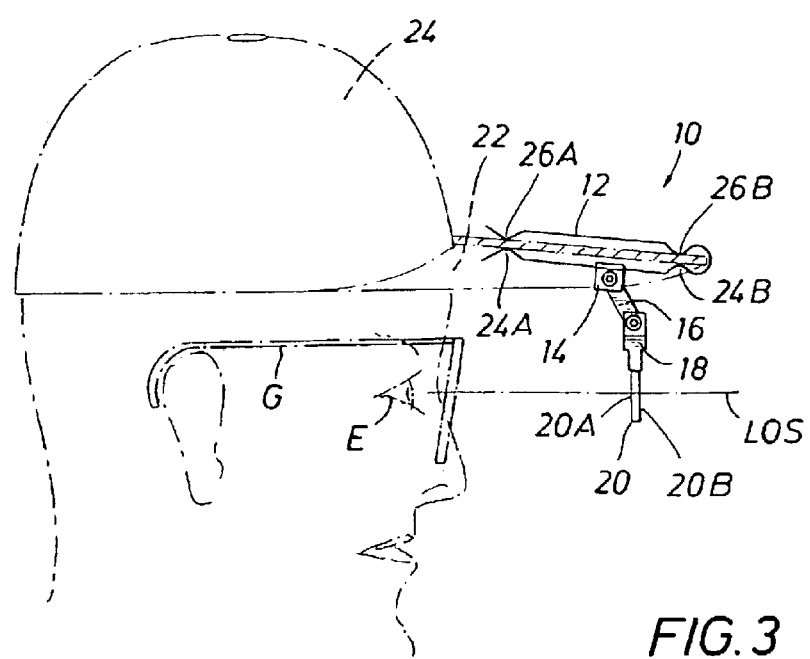
FIG. 3 is a side view of the present invention with the carriage sliding portion moved outwardly and the magnifying lens in the line-of-sight position, similar to FIG. 1.
Figure 5:
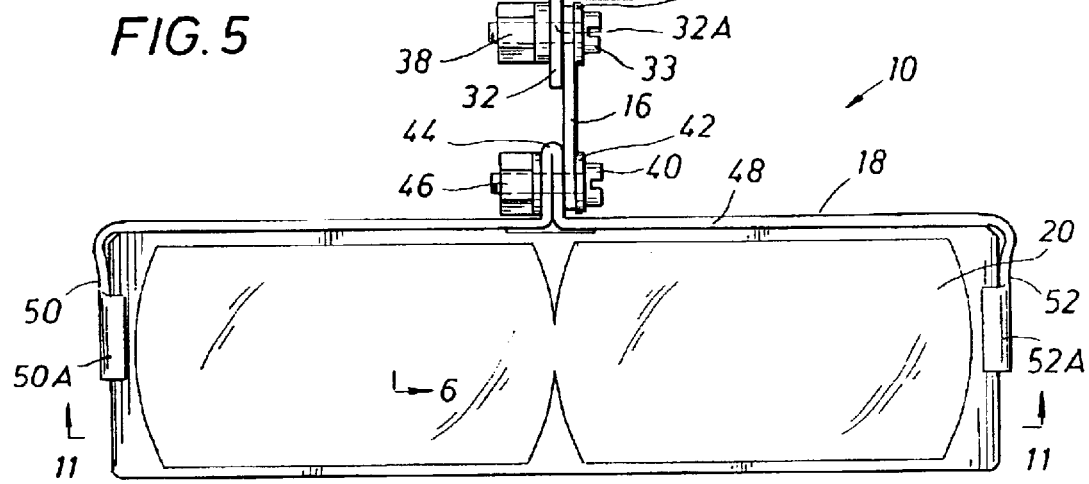
FIG. 5 is an enlarged elevational view of the present invention with the magnifying lens in the line-of-sight position and the clip upper and lower positioning members shown cut away to better illustrate the carriage sliding portion attached to the clip lower positioning member.
Figure 6:
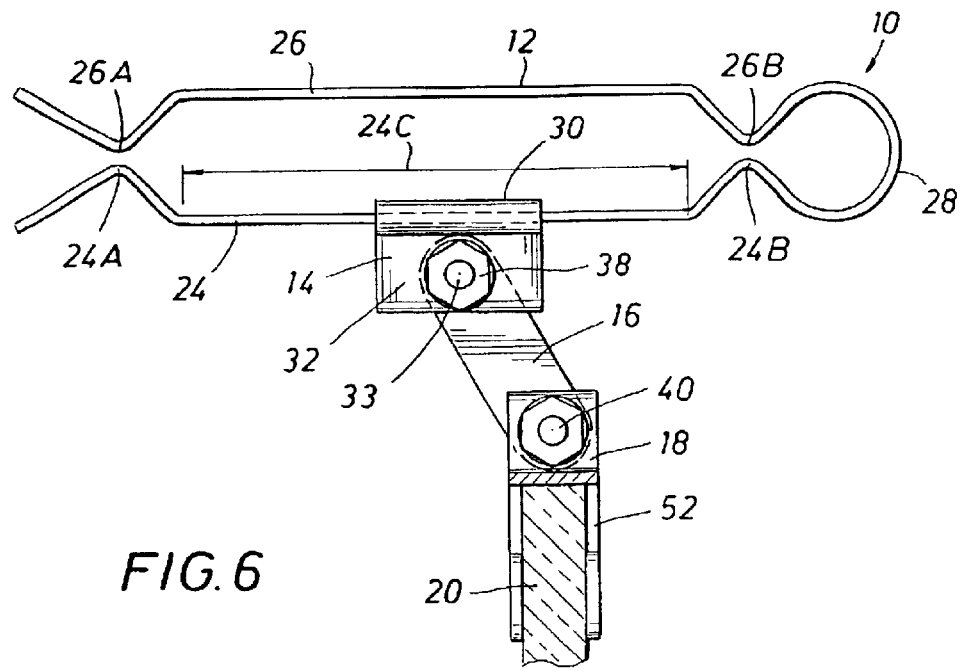
FIG. 6 is a side view of the present invention taken along lines 6—6 of FIG. 5.

Turning now to FIGS. 5 and 6, the clip 12 includes an upper positioning member 26 and a lower positioning member 24 that are preferably integrally joined at the circular portion 28 of the clip 12. As best shown in FIGS. 3 and 6, the upper positioning member 26 and the lower positioning member 24 have opposed bent portions therein 24A, 24B and 26A, 26B, respectively, for providing a friction fit with the visor 22. While the clip 12 is preferably fully inserted onto the visor 22, as shown in FIG. 3, the clip 12 can function using only the bent portions 26A and 24A of the clip 12 received onto the visor 22. The carriage 14 includes a sliding portion 30 and a supporting portion or member 32. The sliding portion 30 is slidably positioned with the lower positioning member 24, and the supporting portion 32 extends below the lower positioning member 24. As best shown in FIG. 6, a portion of the lower positioning member, indicated as 24C, is referred to as the track. It is this portion of the lower positioning member 24 that the sliding portion 30 of the carriage 14 moves on. Preferably, the distance of the track 24C is 1¾". As can best be seen in FIGS. 5 and 6, the supporting portion 32 extends below the track 24C of the lower positioning member 24. Preferably, the carriage 14 and clip 12 are manufactured from rolled wire with smooth radiused edges to facilitate movement of the carriage 14 on the track 24C. It is also contemplated that a continuous, resilient rod mounting bracket, such as reference 12 disclosed in FIG. 2 in U.S. Pat. No. 5,208,916, could be used in place of clip 12.

Turning now to FIG. 5, the carriage supporting portion 32 preferably includes an aperture 32A sized to receive a screw 33 therethrough. The screw 33 includes a head portion, that preferably is a Phillips head, though could be a flat head as shown, that is received through a lock washer 34, through an aperture in the first end of the link 16, through aperture 32A of the supporting portion 32, and then threadably received with a self-locking nut 38 to provide adjustable friction forces between the link 16 and the carriage supporting portion 32. The nut 38 is preferably an 18-8 nickel/chromium nut. The preferred link 16 is approximately 1" long, though an alternative elongated link approximately 1½" long could be used in place of the preferred link 16, as discussed below. As shown in FIGS. 5 and 6, pivotably connecting the link 16 to the carriage supporting member 32 allows pivoting of the holding member 18 relative to the clip 12. The second end of the link 16 also includes an aperture to receive a screw 40, preferably identical to screw 33 for inventory reduction. The screw 40 is received through lock washer 42, preferably identical to washer 34, through an aperture in the second end of the link 16, through an opening in the formed tab 44 of the holding member 18, and then threadably received with a self-locking nut 46, preferably identical to nut 38. Again, this fastening means allows adjustable friction forces in pivoting of the holding member 18 relative to the link 16. Alternatively, the supporting portion 32 could be elongated equal to the distance of the preferred link 16 or any other desirable length and pivotably positioned with the holding member 18 using the screw 40, lock washer 42, tab 44, and nut 46 (not shown). This would provide a two adjustment point sliding/pivoting mechanism for an alternative embodiment.

Preferably, the formed tab 44 extends approximately ¼" from the bar 48 of the holding member 18. A Phillips or flathead screwdriver and a ¼" wrench could be used to provide the desired friction between the link 16 and the carriage 14, and the link 16 and holding member 18 by adjusting the nut and screw fastening means. It is contemplated that other adjustable fastening means known to those of skill in the art could be used.

Figure 7:
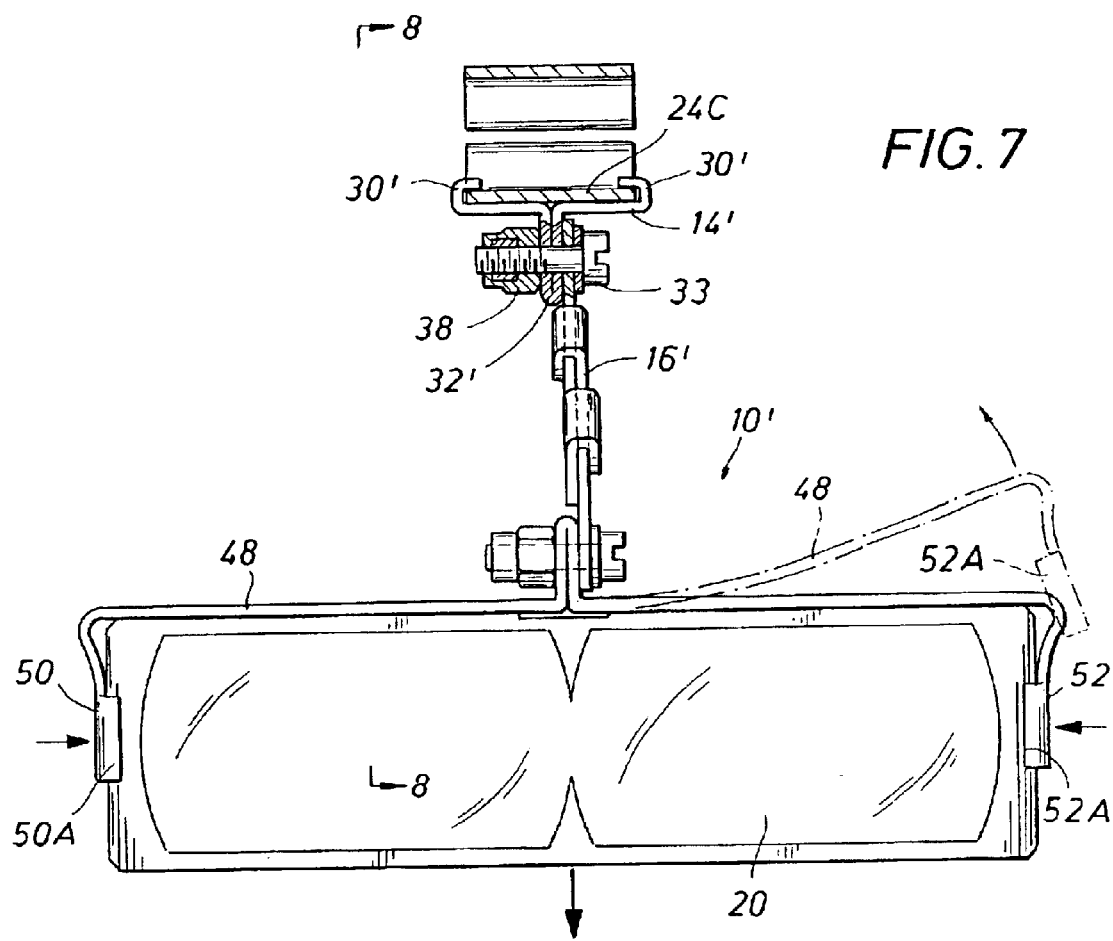
FIG. 7 is an alternative embodiment of the present invention, in a view similar to FIG. 5, illustrating an alternative carriage and telescoping link with the holding member moved from a gripping position to grip the magnifying lens, as shown in solid lines, to a flexed position, shown in phantom view, to facilitate removal of the magnifying lens.
Figure 11:
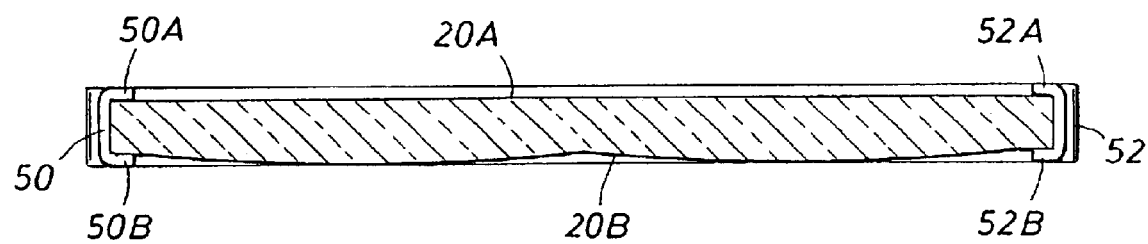
FIG. 11 is a section view taken along lines 11—11 of FIG. 5.
Figure 12:
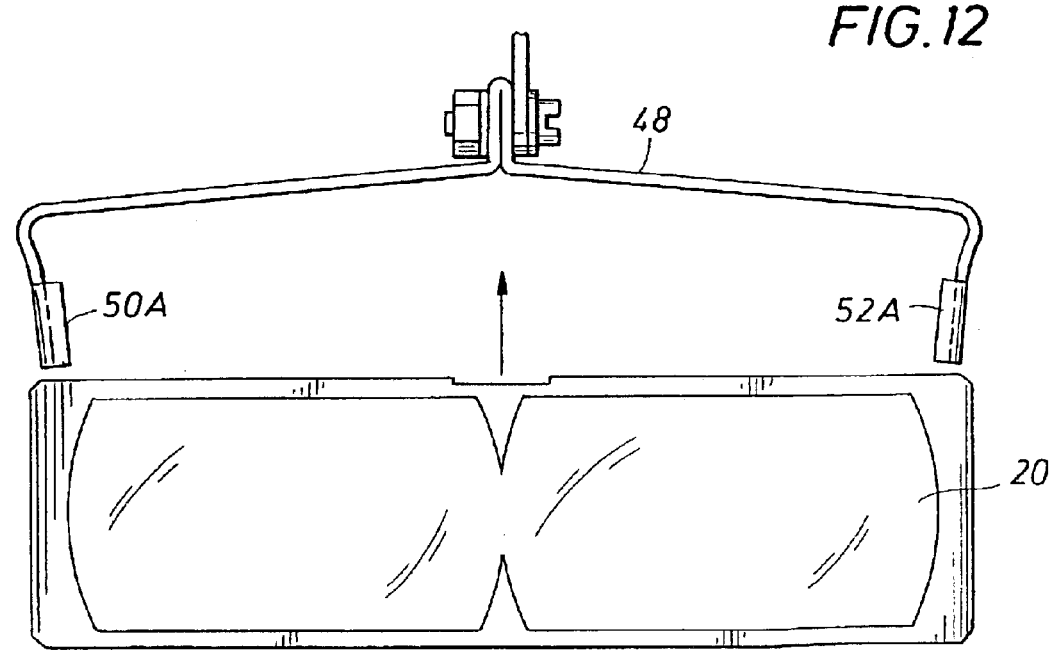
FIG. 12 is a view similar to the view of the magnifying lens in FIGS. 5 and 7 with the link member cut away and the holding member shown in the rest position before positioning of the magnifying lens therein.

Turning now to the holding member 18, as best shown in FIGS. 5, 6, 7 and 12, the bar 48 is positioned between two opposed portions or members 50 and 52. As best shown in FIGS. 5, 11 and 12, each of the portions 50, 52 includes inset tabs 50A, 50B and 52A, 52B, respectively. The distance between the bar and the bottom of the inset tabs is preferably approximately ½". The holding member 18 is movable between a rest position, as best shown in FIG. 12, a gripping position, as shown in FIG. 5, and a flexed position, as best shown in FIG. 7 (where only one side is flexed). In the flexed position, one set of inset tabs are flexed outwardly from the lens 20 thereby facilitating removal of the magnifying lens 20. Either set of inset tabs can be moved away from the lens 20. Of course, inset tabs 50A, 50B and 52A, 52B could both be moved away from the lens 20 to facilitate removal. The holding member 18 is preferably fabricated from metal having the ability to spring back to the rest position, and therefore the gripping position, after being flexed to maintain the gripping action on the lens.

Because of the holding force multiplier due to leverage, the lens 20 when in the gripping position with the holding member, resists being slidably removed from the holding member. It is believed that application of sliding force to the lens 20 when in the gripping position will increase the holding force several times. Therefore, the holding force is removed by flexing one or both sides of the holding member, as discussed above, so that the lens can be removed.

Preferably, the lens 20 is 3.465" long and 1.055" high. The lens 20 is preferably a clear optical-grade acrylic, binocular lens, free of distortions or irregularities. As best shown in FIGS. 3 and 11, the magnifying lens 20 includes a flat side 20A and a curved side 20B (plano-convex). The flat side 20A of the lens should be positioned closest to the eye E of the user, as best shown in FIG. 3.

Turning to the alternative embodiment of the visor magnifier 10' of FIGS. 7, 8, 9 and 10, all the parts are identical to the visor magnifier 10 except for replacement of the carriage 14 with a carriage 14', and replacement of link 16 with an adjustable length link 16'.

Figure 8:
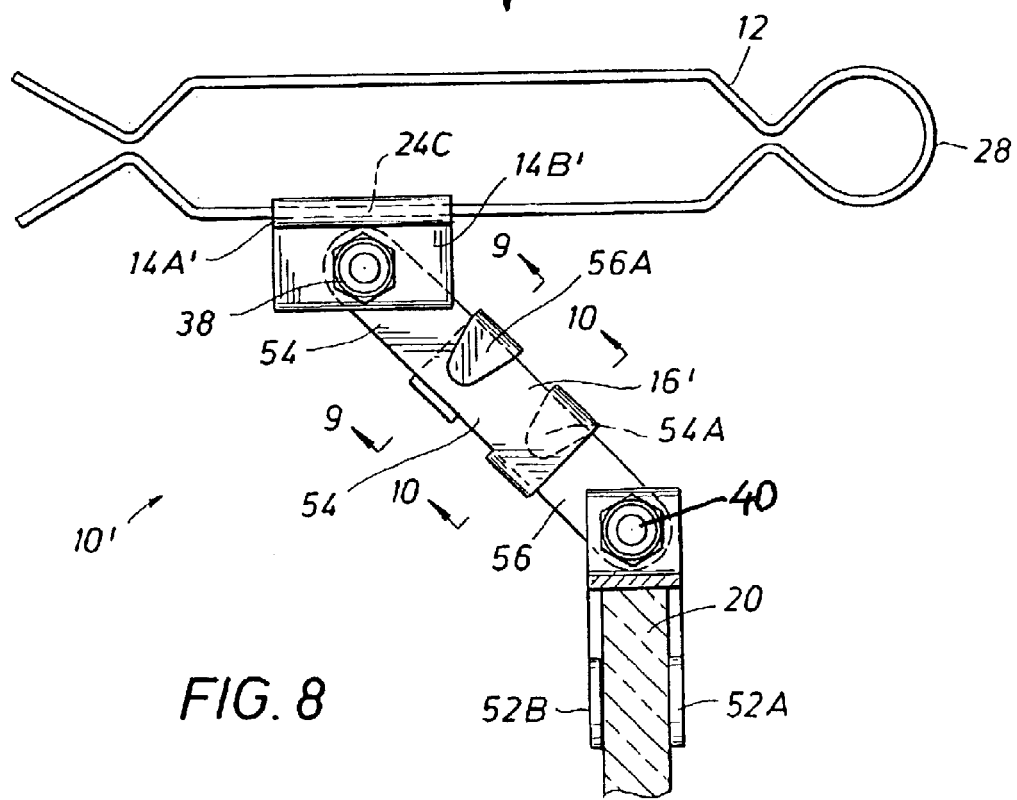
FIG. 8 is a side view of the alternative embodiment taken along lines 8—8 of FIG. 7 to better illustrate the telescoping link.

As best shown in FIGS. 7 and 8, carriage 14' includes a sliding portion 30' that is received above the track 24C of the lower positioning member 24. The carriage supporting member 32' extends below the track 24C for securing the carriage 14' with the link 16'. In this alternative embodiment, when the screw 33 is tightened with nut 38, the supporting portion 32' can be compressed thereby squeezing the opposed sliding portions 30' towards the track 24C to provide varying range of friction therebetween.

Figure 9:
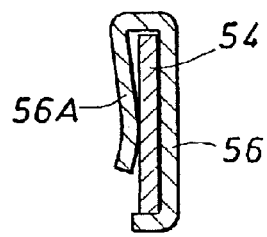
FIG. 9 is an enlarged section view taken along lines 9—9 of FIG. 8.
Figure 10:
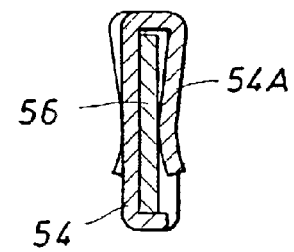
FIG. 10 is an enlarged section view taken along lines 10—10 of FIG. 8.

The adjustable length link 16' is a telescopic friction link fabricated from link portion 54 and link portion 56. As best shown in FIGS. 8, 9 and 10, link portion 54 includes a tab 54A and link portion 56 includes tab 56A. Tabs 54A and 56A are bent, as illustrated, to provide a friction link that can telescope. Preferably, the link 16' can be adjusted between 1⅛" and 1¾" from the axis of screws 33 and 40.

It is contemplated that the alternate carriage 14' and link 16' could be used in any combination with the embodiments discussed above.

USE AND OPERATION

The lens 20 is removable from the holding member 18, as discussed above, and could be replaced with other lenses of different powers of magnification. For example, it is contemplated that four lenses will be available having powers of 1.6, 2.0, 2.25 and 2.75. When the user selects the desired power of the magnifying lens and/or it is installed on the holding member 18, the user can position the clip 12 onto the visor 22 of his cap/hat/headband, for example, such as shown in FIG. 3. In this position, the bent portions 24A, 24B and 26A, 26B provide a friction fit to engage the visor 22. The carriage 14 can then be moved forward or backwards along track 24C, as best shown in FIG. 6, to the desired location. The link 16 can then be pivoted relative to the supporting portion 32 of the carriage 14, and the holding member 18 can also be pivoted relative to the link 16 to provide the lens 20 in the desired line-of-sight (LOS), for example, such as shown in FIG. 3. Generally, the lens 20 will be moved to an optimum position in relation to the user's eye E for proper focusing of the lens 20 relative to the image or object being viewed.

As can be seen in FIG. 3, the present invention can be used in combination with eyeglasses G. If the eyeglasses G include bifocals, an elongated link for bifocal use can be included in the kit to replace link 16 to allow positioning of the lens 20 along the line-of-sight LOS for the lower portion of the bifocals. Alternatively, link 16' could be adjusted to a desired length.

The position of the binocular lens 20 in relation to the eye E and the object being viewed is important. Each eye E must be able to see through its respective portion of the lens 20 and focus on the object being viewed. The lens 20 is designed to function at an approximate distance of 3.5" from the eye E, so that the eyes will both see through the binocular lens 20 and converge at the appropriate working distance for that power lens. The higher the magnification, the closer the working distance. Because of the variation in hat brim lengths, the device 10 or 10' must be capable of forward and backward adjustment to achieve optimum vision.

Figure 4:
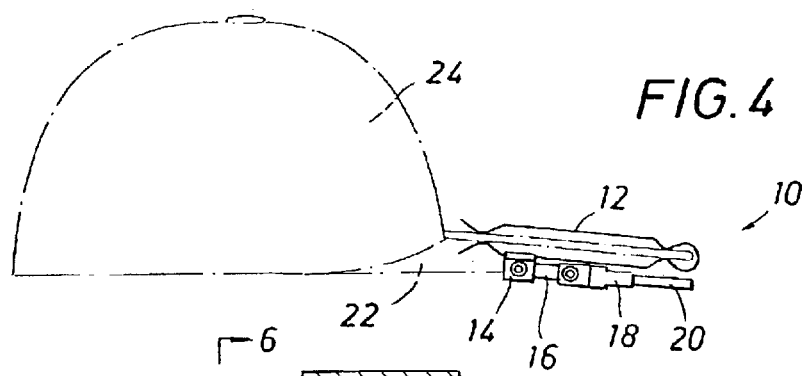
FIG. 4 is a side view of the present invention, similar to FIG. 3, with the carriage sliding portion moved rearwardly and the magnifying lens in the non-use position, similar to FIG. 2.

When the magnifying lens 20 is not in use, it can be moved so that the lens 20 is no longer in the line-of-sight LOS of the user. For example, as best shown in FIGS. 2 and 4, the carriage 14 could be moved to the rearward position on the track 24C, and the link 16 moved parallel to the track 24C along with the lens 20 to a non-use position, where the lens 20 is both out of the line-of-sight LOS of the user and protected by the visor 22.

In the preferred embodiment with the track 24C having the distance of 1¾", and the screw 33 being approximately a ¼" from either end of the carriage supporting portion 32, the screw 33 has a travel range of (1¾"−¼"−¼")=1¼". In the preferred embodiment with the 1" link 16 parallel to the track 24C and the lens 20 perpendicular to the link 16, the lens 20 would therefore have a travel range of (1¼"+1"+1")=3¼". If the 1½" link was used, the travel range would increase to (1¼"+1½"+1½")=4¼". Of course, the adjustable link 16' would provide other travel ranges depending on its telescoped position. As discussed above, this increased travel range of the lens 20 down and away from the visor/brim 22 is desirable when the user is wearing bifocals. While the holding member 18 is preferably flexed to facilitate removal of the magnifying lens 20, to install another magnifying lens or to replace the magnifying lens 20, the lens 20 is slid onto the holding member 18 with the flat side 20A of the magnifying lens 20 closest to the eye E.

As can now be seen, a two or three adjustment point magnifier is removably mounted on a visor where a magnifying lens 20 can be slid forward and backward to adjust the position of the magnifying lens in combination with pivoting the selected lens into and out of a viewing position. Also, a holding member 18 is disclosed that is fabricated to grip the lens 20 to resist inadvertent removal, particularly since the bar 48 of the holding member 18 is above the lens 20 and the inset tabs 50A, 50B and 52A, 52B grip the lens 20 at its sides when the lens is in use.

It will be understood that the details as to the dimensions and measurements disclosed herein are for the preferred embodiment, but are not to be limiting except in terms of relationships of the various components of the device.

The foregoing disclosure and description of the invention are illustrative and explanatory thereof, and various changes in the size, shape and materials as well as in the details of the illustrated construction may be made without departing from the spirit of the invention.

I claim:

1. An apparatus for positioning a lens, comprising:
   a first member;
   a carriage movably positionable with said first member; and
   a holding member pivotably positioned with said carriage, said holding member movable between a gripping position and a flexed position, the lens gripped by said holding member when said holding member is in said gripping position and the lens removable from said holding member when said holding member is in said flexed position.

2. The apparatus of claim 1, further comprising a clip, said clip including said first member.

3. The apparatus of claim 1, said carriage comprising:
   a sliding member slidably positionable with said first member; and
   a support member extending from said sliding member.

4. The apparatus of claim 3, further comprising:
   a link member, said link member pivotably positioned with said support member and said holding member.

5. The apparatus of claim 4, said link member comprising:
   a first portion pivotably positionable with said support member; and
   a second portion interconnected with and extensible from said first portion.

6. The apparatus of claim 4,
   wherein said link member is removably connectable to said support member and said holding member, and
   wherein said link member is selected from a plurality of link members, each link member having a different length.

7. An apparatus for positioning a lens, comprising:
   a first member;
   a link means for varying the distance between said first member and the lens, said link means having a first end and a second end, said first end of said link means pivotably positioned with said first member; and
   a holding member pivotably positioned with said second end of said link means,
   wherein the lens is removably positioned with said holding member.

8. The apparatus of claim 7, wherein said link means is selected from a plurality of links, each of said plurality of links having a different length.

9. The apparatus of claim 7, wherein said link means is extensible.

10. The apparatus of claim 9, wherein said link means is capable of telescoping.

11. The apparatus of claim 7, wherein said link means is slidably postionable with said first member.

12. An apparatus for positioning a lens, comprising:
    a first member;
    a carriage slidably positionable with said first member; and
    a holding member pivotably positioned with said carriage, said holding member adapted for slidably inserting the lens into said holding member.

13. The apparatus of claim 12,
    wherein the lens has an edge, and
    wherein said holding member is located about at least a portion of the edge of the lens upon insertion of the lens into said holding member.

14. The apparatus of claim 12, further comprising a link member pivotably positioned between said carriage and said holding member.

15. The apparatus of claim 14, wherein said link member is extensible.

16. The apparatus of claim 14, further comprising:
    a first frictionally adjustable means for fastening said carriage and said link member; and
    a second frictionally adjustable means for fastening said link member and said holding member.

17. An apparatus for positioning a lens, comprising:
    a first member;
    a link having a first end and a second end, said first end of said link pivotably positioned with said first member; and
    a holding member pivotably positioned with said second end of said link and adapted for slidable insertion of the lens into said holding member.

18. The apparatus of claim 17,
    wherein the lens has an edge, and
    wherein said holding member is located about at least a portion of the edge of the lens upon insertion of the lens into said holding member.

19. The apparatus of claim 17, wherein said link is slidably positionable with said first member.

20. The apparatus of claim 17, further comprising a clip, said clip including said first member.

21. An apparatus for positioning a lens, comprising:
    a first member; and
    a holding member pivotably positioned with said first member and having a set of inset tabs, said holding member movable between a gripping position and a flexed position, the lens gripped by said set of inset tabs of said holding member when said holding member is in said gripping position and the lens removable from said set of inset tabs of said holding member when said holding member is in said flexed position.

22. The apparatus of claim 21, further comprising a clip, said clip including said first member.

23. The apparatus of claim 21, further comprising:
    a carriage positionable with said first member, said carriage comprising:
    a sliding member positionable with said first member; and
    a support member extending from said sliding member.

24. The apparatus of claim 21, further comprising:
    a link member, said link member pivotably positioned between said first member and said holding member.

25. The apparatus of claim 24, said link member comprising:
- a first portion pivotably positionable with said first member; and
- a second portion interconnected with and extensible from said first portion.

26. The apparatus of claim 24,
- wherein said link member is removably connectable between said first member and said holding member, and
- wherein said link member is selected from a plurality of link members, each link member having a different length.

27. The apparatus of claim 21, the holding member comprising:
- a plurality of set of inset tabs.

28. An apparatus for positioning a lens, comprising:
- a first member;
- a carriage movably positionable with said first member;
- a holding member pivotably positioned with said carriage, said holding member movable between a gripping position and a flexed position, the lens gripped by said holding member when said holding member is in said gripping position and the lens removable from said holding member when said holding member is in said flexed position; and
- an extensible link member, said link member pivotably positioned between said first member and said holding member.

29. The apparatus of claim 28, wherein the extensible link member is capable of telescoping.

* * * * *